United States Patent
Lin

(10) Patent No.: US 10,769,795 B2
(45) Date of Patent: *Sep. 8, 2020

(54) IMAGE PROCESSING METHOD AND DEVICE

(71) Applicant: Alibaba Group Holding Limited, George Town (KY)

(72) Inventor: Tong Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,474

(22) Filed: Dec. 18, 2019

(65) Prior Publication Data

US 2020/0126238 A1 Apr. 23, 2020

Related U.S. Application Data

(63) Continuation of application No. 16/043,636, filed on Jul. 24, 2018, which is a continuation of application No. PCT/CN2017/071256, filed on Jan. 16, 2017.

(30) Foreign Application Priority Data

Jan. 25, 2016 (CN) .......................... 2016 1 0049672

(51) Int. Cl.
*G06T 7/174* (2017.01)
*G06T 3/40* (2006.01)
(Continued)

(52) U.S. Cl.
CPC .............. *G06T 7/174* (2017.01); *G06F 17/16* (2013.01); *G06K 9/629* (2013.01); *G06K 9/6218* (2013.01); *G06T 3/40* (2013.01); *G06T 5/50* (2013.01)

(58) Field of Classification Search
None
See application file for complete search history.

(56) References Cited

U.S. PATENT DOCUMENTS 6,075,875 A * 6/2000 Gu .......................... G06T 9/001
375/E7.04
7,586,646 B2 * 9/2009 Fan .................... H04N 1/40062
358/2.1
(Continued)

FOREIGN PATENT DOCUMENTS

| CN | 102436589 | 5/2012 |
| CN | 102954794 | 3/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Fayyaz Alam
(74) *Attorney, Agent, or Firm* — Fish & Richardson P.C.

(57) ABSTRACT

A first image to be processed is identified, where the first image includes one or more interference factors. The one or more interference factors are removed from the first image using a plurality of different interference factor removal techniques to obtain a plurality of sample images, where each of the plurality of sample images is associated with a particular interference factor removal technique. Each sample image of the plurality of sample images is segmented into a plurality of sample sub-images based on a segmentation rule, where each sample sub-image is associated with an attribute. A plurality of target sub-images is determined from the plurality of sample su b-images, where each target sub-image comprises a combination of sample sub-images associated with a common attribute, and where each target
(Continued)

sub-image is associated with a different attribute. The plurality of target sub-images associated with different attributes is combined into a target image.

20 Claims, 6 Drawing Sheets

(51) Int. Cl.
  *G06K 9/62* (2006.01)
  *G06F 17/16* (2006.01)
  *G06T 5/50* (2006.01)

(56) References Cited

U.S. PATENT DOCUMENTS

| | | |
|---|---|---|
| 2010/0092075 A1 | 4/2010 | Lee et al. |
| 2012/0065518 A1* | 3/2012 | Mangoubi ............... A61B 3/12 600/473 |
| 2016/0048837 A1* | 2/2016 | Jin ....................... G06Q 20/409 705/76 |
| 2019/0005651 A1 | 1/2019 | Lin |

FOREIGN PATENT DOCUMENTS

| | | | |
|---|---|---|---|
| CN | 103839275 | 6/2014 | |
| CN | 106997580 A * | 8/2017 | ........... G06K 9/6218 |
| TW | 201002048 | 1/2010 | |
| WO | WO 2005008519 | 1/2005 | |

OTHER PUBLICATIONS

Extended European Search Report in European Application No. 17743592.2, dated Jul. 19, 2019, 8 pages.
Goshtasby et al., "Fusion of Multi-Exposure Images," Image and Vision Computing, Jun. 2005, 23(6): 611-618.
International Preliminary Report on Patentability in International Application No. PCT/CN2017/071258 dated Jul. 31, 2018; 11 pages.
International Search Report and Written Opinion in International Application No. PCT/CN2017/071258 dated Apr. 20, 2017; 9 pages.
Nakamoto, "Bitcoin: A Peer-to-Peer Electronic Cash System," www.bitcoin.org, 2005, 9 pages.
Ning et al., "Analysis and Comparison of Some Techniques on Image Denoising", Journal of Guizhou University of Technology (Natural Science Edition), Aug. 2005, 4 pages (with English Abstract).

* cited by examiner

Image A

| A11 | A12 | A13 |
|-----|-----|-----|
| A21 | A22 | A23 |
| A31 | A32 | A33 |

FIG. 2

IMAGE PROCESSING METHOD AND DEVICE

CROSS-REFERENCE TO RELATED APPLICATIONS

This application is a continuation of U.S. application Ser. No. 16/043,636, filed on Jul. 24, 2018, which is a continuation of PCT Application No. PCT/CN2017/071256, filed on Jan. 16, 2017, which claims priority to Chinese Patent Application No. 201610049672.0, filed on Jan. 25, 2016, and each application is hereby incorporated by reference in its entirety.

TECHNICAL FIELD

The present application relates to the field of image processing technologies, and in particular, to image processing methods and devices.

BACKGROUND

With the rapid development of Internet technologies, image recognitions such as face recognition and certificate image recognition are used in more and more network services. However, many images are marked by reticulated patterns and watermarks. As a result, image recognition efficiency reduces and image recognition difficulty increases.

SUMMARY

A main object of the present application is to provide image processing methods and devices.

The present application is implemented by using the following technical solutions:

An image processing method is provided, where the method includes: removing an interference factor from an original image by using a plurality of methods, to obtain a plurality of sample images; segmenting each sample image into a plurality of sample sub-images based on a predetermined segmentation rule; determining a target sub-image from sample sub-images that have the same attributes; and combining a plurality of target sub-images with different attributes into a target image.

Optionally, the determining a target sub-image from sample sub-images that have the same attributes includes: determining a mathematical parameter of each sample sub-image; dividing the sample sub-images that have the same attributes into a plurality of image sets based on the mathematical parameters by using a clustering algorithm, where each image set includes one or more sample sub-images; and determining the target sub-image from an image set that includes the maximum number of sample sub-images.

Optionally, the determining a mathematical parameter of each sample sub-image includes: generating an RGB vector for the sample sub-image based on RGB information of each pixel in the sample sub-image to use the RGB vector as the mathematical parameter of the sample sub-image.

Optionally, the determining the target sub-image from an image set that includes the maximum number of sample sub-images includes: determining, as the target sub-image from the image set that includes the maximum number of sample sub-images, a sample sub-image that corresponds to the center point in the image set obtained after clustering.

Optionally, the combining a plurality of target sub-images with different attributes into a target image includes: combining the plurality of target sub-images with different attributes into the target image based on location coordinates of each pixel in the target sub-image.

An image processing device is provided, where the device includes: an interference removing unit, configured to remove an interference factor from an original image by using a plurality of methods, to obtain a plurality of sample images; an image segmentation unit, configured to segment each sample image into a plurality of sample sub-images based on a predetermined segmentation rule; a target determining unit, configured to determine a target sub-image from sample sub-images that have the same attributes; and a target combination unit, configured to combine a plurality of target sub-images with different attributes into a target image.

Optionally, the target determining unit includes: a parameter determining subunit, configured to determine a mathematical parameter of each sample sub-image; a set division subunit, configured to divide the sample sub-images that have the same attributes into a plurality of image sets based on the mathematical parameters by using a clustering algorithm, where each image set includes one or more sample sub-images; and a target determining subunit, configured to determine the target sub-image from an image set that includes the maximum number of sample sub-images.

Optionally, the parameter determining subunit is configured to generate an RGB vector for the sample sub-image based on RGB information of each pixel in the sample sub-image to use the RGB vector as the mathematical parameter of the sample sub-image.

Optionally, the target determining subunit is configured to determine, as the target sub-image from the image set that includes the maximum number of sample sub-images, a sample sub-image that corresponds to the center point in the image set obtained after clustering.

Optionally, the target combination unit is configured to combine the plurality of target sub-images with different attributes into the target image based on location coordinates of each pixel in the target sub-image.

It can be seen that in the present application, the interference factor in the original image can be removed first by using the plurality of methods, to obtain a plurality of sample images. Each of the plurality of sample images can then be segmented into a plurality of sample sub-images based on the predetermined segmentation rule. The target sub-image can then be determined from the sample sub-images that have the same attributes, so that a target sub-image most similar to a real image can be determined from the plurality of sample sub-images that have the same attributes. The plurality of target sub-images with different attributes can then be combined into the target image. As such, the obtained target image can restore the real image with high precision to improve accuracy of subsequent image recognition.

BRIEF DESCRIPTION OF DRAWINGS

FIG. 2 is a schematic diagram illustrating segmentation of a sample image, according to an example implementation of the present application;

DESCRIPTION OF IMPLEMENTATIONS

Example implementations are described in detail here, and examples of the implementations are presented in the accompanying drawings. When the following description refers to the accompanying drawings, unless specified otherwise, same numbers in different accompanying drawings represent the same or similar elements. Implementations described in the following example implementations do not represent all implementations consistent with the present application. On the contrary, they are only examples of devices and methods described in the appended claims in detail and consistent with some aspects of the present application.

The terms used in the present application are merely used for the purpose of illustrating implementations, and are not intended to limit the present application. The terms "a", "said" and "the" of singular forms used in the present application and the appended claims are also intended to include plural forms, unless otherwise specified in the context. It should also be understood that, the term "and/or" used here indicates and includes any or all possible combinations of one or more associated items.

It should be understood that although the terms "first", "second", "third", etc. can be used in the present application to describe various types of information, the information is not limited by the terms. These terms are merely used to differentiate information of the same type. For example, without departing from the scope of the present application, first information may be referred to as second information, and similarly the second information may also be referred to as the first information. Depending on the context, for example, the word "if" used here may be explained as "while", "when", or "in response to determining".

In the related technology, some image processing algorithms or image processing tools such as Photoshop can be used to remove reticulated patterns or watermarks in an original image. However, in such cases, an image obtained by removing the reticulated pattern or the watermark usually cannot restore the real image of the original image. As a result, image recognition accuracy may be affected.

Figure 1:
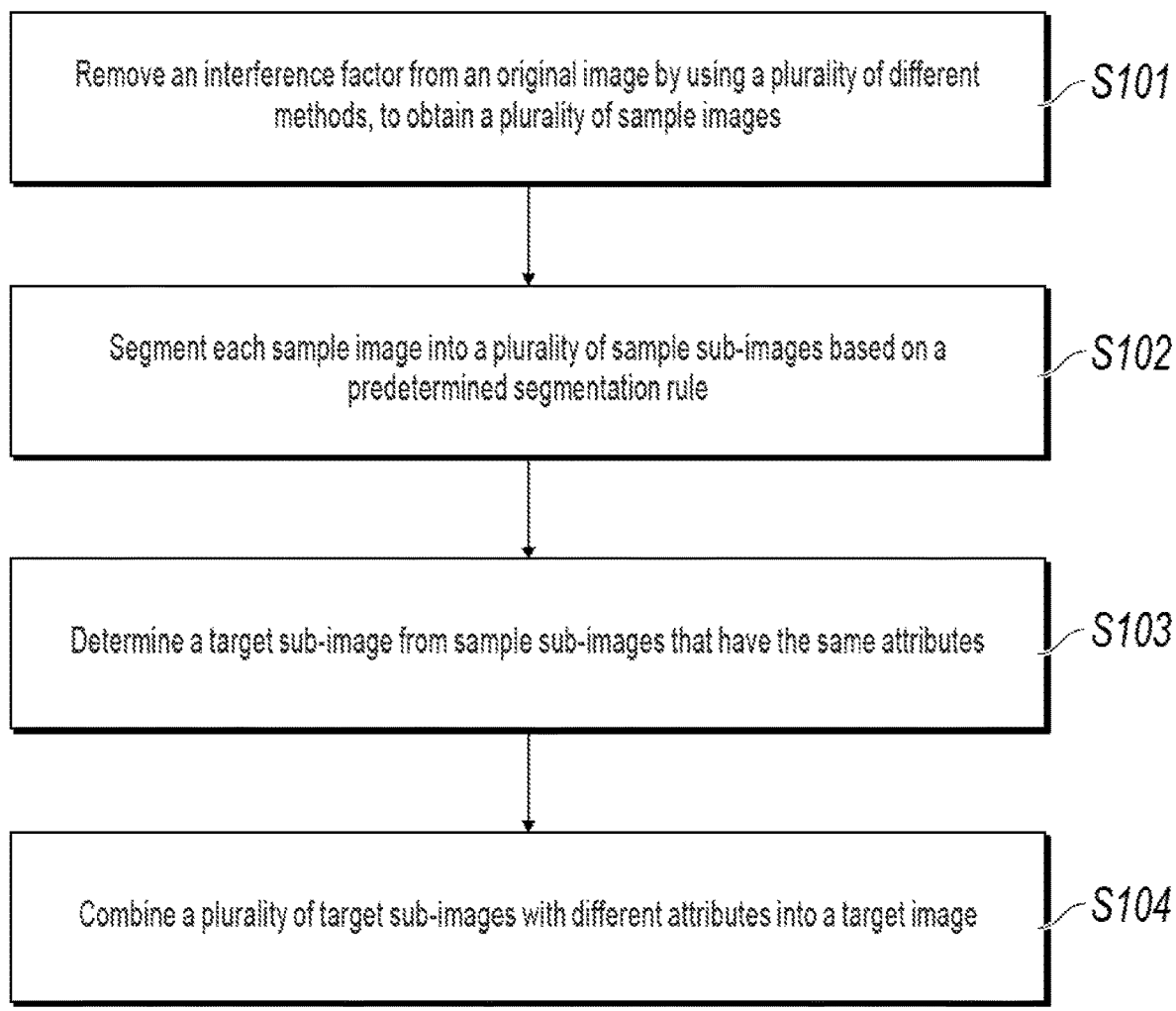
FIG. 1 is a schematic flowchart illustrating an image processing method, according to an example implementation of the present application.

FIG. 1 is a schematic flowchart illustrating an image processing method, according to an example implementation of the present application.

Referring to FIG. 1, the image processing method can be applied to a terminal device. The terminal device can include an intelligent device such as a smartphone, a tablet computer, a personal digital assistant (PDA), and a PC. The image processing method can also be applied to a server, which is not limited in the present application. The image processing method can include the following steps.

Step 101: Remove an interference factor from an original image by using a plurality of methods, to obtain a plurality of sample images.

In the present implementation, the original image is usually an image to be recognized. The original image may include one or more interference factors. The interference factor is usually an interference pattern such as a reticulated pattern or a watermark added to the real image.

In the present implementation, the interference factor in the original image can be removed by using different interference factor removing methods provided in the related technology to obtain the plurality of sample images. For example, the interference factor in the original image can be removed by using image processing software such as Photoshop.

Step 102: Segment each sample image into a plurality of sample sub-images based on a predetermined segmentation rule.

Based on step 101, after the plurality of sample images are obtained, each sample image can be segmented into a plurality of sub-images based on the predetermined segmentation rule. For ease of description, the sub-image obtained after the segmentation can be referred to as a sample sub-image.

In the present implementation, the predetermined segmentation rule can be set by a developer. In the predetermined segmentation rule, the unit used for segmenting can be the size of the sample sub-image, or a number of sample sub-images, which is not limited in the present application. For example, the predetermined segmentation rule can be segmenting a sample image into 25 sample sub-images, such as segmenting the sample image into 25 sample sub-images based on a 5×5 rule.

In the present implementation, N sample images can be obtained if the interference factor in the original image is removed by using N different methods in step 101. Further, a total of N×M sample sub-images can be obtained if each sample image is segmented into M sample sub-images. M and N are natural numbers greater than 1.

Step 103: Determine a target sub-image from sample sub-images that have the same attributes.

Figure 2:
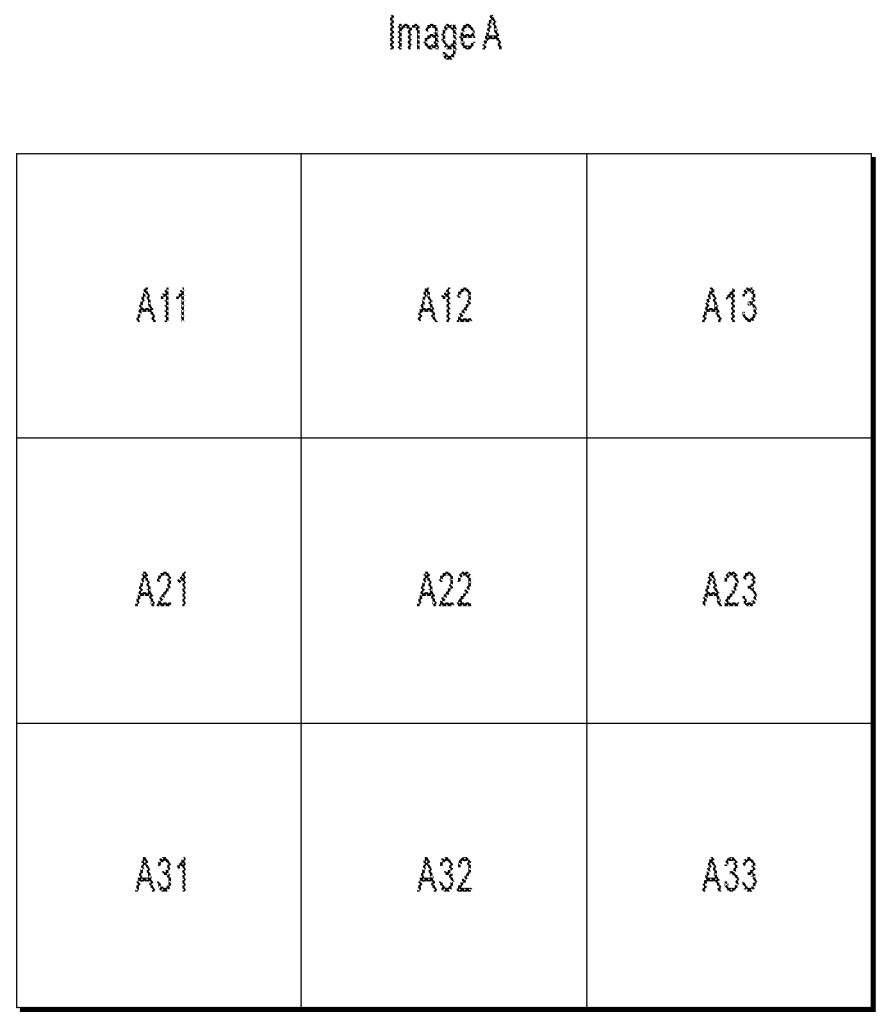

In the present implementation, each sample sub-image includes a corresponding attribute. The attribute can be used to indicate location information of the sample sub-image in a sample image that includes the sample sub-image. Referring to FIG. 2, assume that image A is a sample image obtained by removing interference in the original image. The sample image can be segmented into 3×3 sample sub-images based on the predetermined segmentation rule. Attributes of the nine sample sub-images are respectively A11, A12, A13, A21, . . . , and A33.

In the present implementation, the segmentation rule shown in FIG. 2 is used as an example. A total of N×9 sample sub-images can be obtained if the interference factor in the original image is removed by using N different methods to obtain N sample images. There are N sample sub-images with attributes of one of A11 to A33. In the present step, a target sub-image with attribute A11 can be determined from the N sample sub-images with attributes A11, a target sub-image with attribute A12 can be determined from the N sample sub-images with attribute A12, and nine target sub-images with attributes A11 to A33 can be similarly determined.

Step 104: Combine a plurality of target sub-images with different attributes into a target image.

Based on step 103, after the target sub-image is determined from the sample sub-images that have the same attributes, the plurality of target sub-images with different attributes can be combined into the target image. For example, the plurality of target sub-images can be combined into the target image based on the attribute of each target sub-image, or the plurality of target sub-images can be combined into the target image based on location coordinates of each pixel in each target sub-image, which is not limited in the present application.

For example, the segmentation rule shown in FIG. 2 is used as an example. In the present step, the nine target sub-images with attributes A11 to A33 can be combined into one target image.

It can be seen from the previous description that in the present application, the interference factor in the original image can be removed first by using the plurality of methods, to obtain a plurality of sample images. Each of the plurality of sample images can then be segmented into the plurality of sample sub-images based on the predetermined segmentation rule. The target sub-image can then be determined from the sample sub-images that have the same attributes, so that a target sub-image most similar to the real image can be determined from the plurality of sample sub-images that have the same attributes. The plurality of target sub-images with different attributes can then be combined into the target image. As such, the obtained target image can restore the real image with high precision to improve accuracy of subsequent image recognition.

Figure 3:
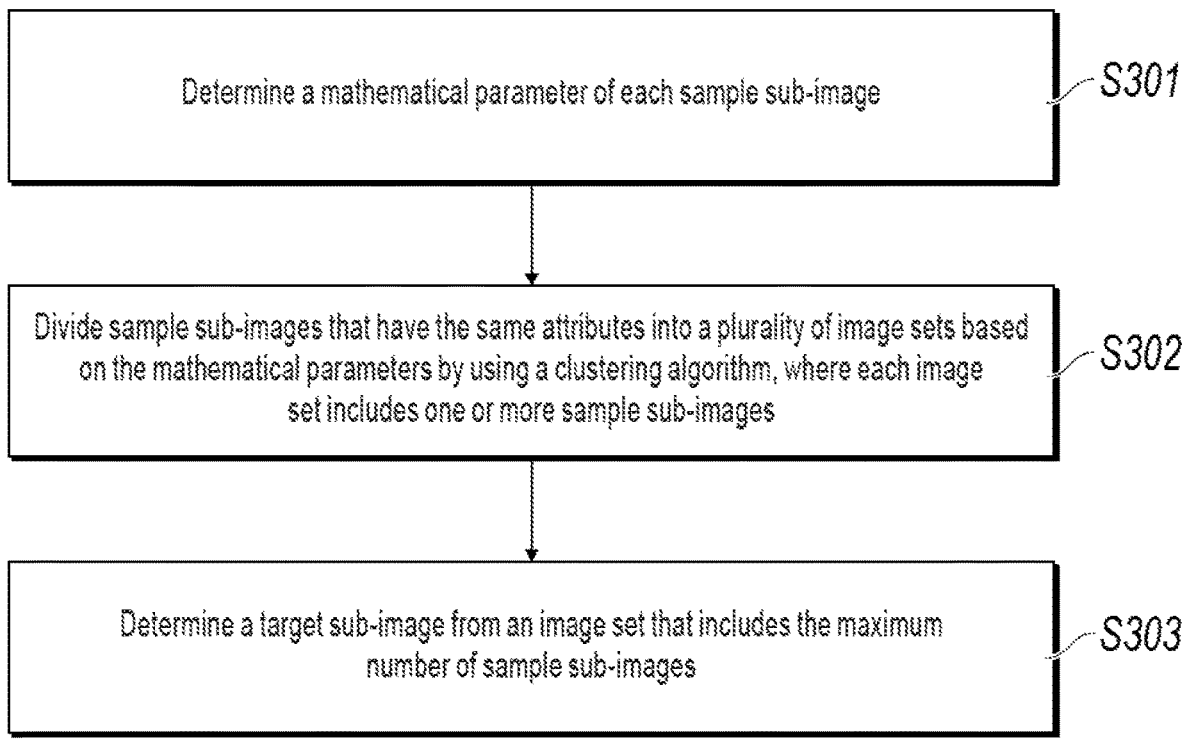
FIG. 3 is a schematic diagram illustrating a procedure for determining a target sub-image from sample sub-images that have the same attributes, according to an example implementation of the present application.

Optionally, in an example of the present application, referring to FIG. 3, a process of determining a target sub-image from sample sub-images that have the same attributes can include the following steps.

Step 301: Determine a mathematical parameter of each sample sub-image.

In the present implementation, after a sample image is segmented into a plurality of sample sub-images, the mathematical parameter of each sample sub-image can be determined for subsequent calculations.

Optionally, in an example of the present application, an RGB vector can be generated for the sample sub-image based on RGB information of each pixel in the sample sub-image to use the RGB vector as the mathematical parameter of the sample sub-image. For example, the RGB information such as an RGB value of each pixel in the sample sub-image can be obtained first. Then the RGB vector can be generated based on the RGB information of each pixel. The RGB vector of the sample sub-image can be $\{R_1, R_2, \ldots, R_K\}$ if the sample sub-image includes K pixels, where an RGB value of the ith pixel is $R_i$, and a value of i is 1 to K.

Step 302: Divide the sample sub-images that have the same attributes into a plurality of image sets based on the mathematical parameters by using a clustering algorithm, where each image set includes one or more sample sub-images.

In the present implementation, the plurality of sample sub-images that have the same attributes can be divided into the plurality of image sets based on the mathematical parameters of the sample sub-images by using the clustering algorithm. The clustering algorithm can include a Density-Based Spatial Clustering of Applications with Noise (DB-SCAN) clustering algorithm, a K-means clustering algorithm, etc., which are not limited in the present application.

For example, a scanning radius (eps) and the minimum number of points (minPts) can be predetermined when the DBSCAN clustering algorithm is used. Each sample sub-image corresponds to one point in a clustering process. The minimum number of points is the minimum number of sample sub-images that can be included in an image set obtained after the division. In the clustering process, related calculation can be performed based on the mathematical parameter of the sample sub-image. For example, a distance between RGB vectors of two sample sub-images can be used as a distance between the two sample sub-images.

Step 303: Determine the target sub-image from an image set that includes the maximum number of sample sub-images.

Based on step 302, after the sample sub-images that have the same attributes are divided into the plurality of image sets, the number of sample sub-images included in each image set is determined, and then the target sub-image can be determined from the image set that includes the maximum number of sample sub-images.

Optionally, in an example of the present application, a sample sub-image that corresponds to the center point in the image set obtained after clustering can be determined as the target sub-image from the image set that includes the maximum number of sample sub-images.

In the present implementation, the clustering algorithm can be used to determine the target sub-image from the sample sub-images that have the same attributes, to ensure that the determined target sub-image is more similar to a real image.

Corresponding to the implementation of the image processing method, the present application further provides an implementation of an image processing device.

Figure 4:
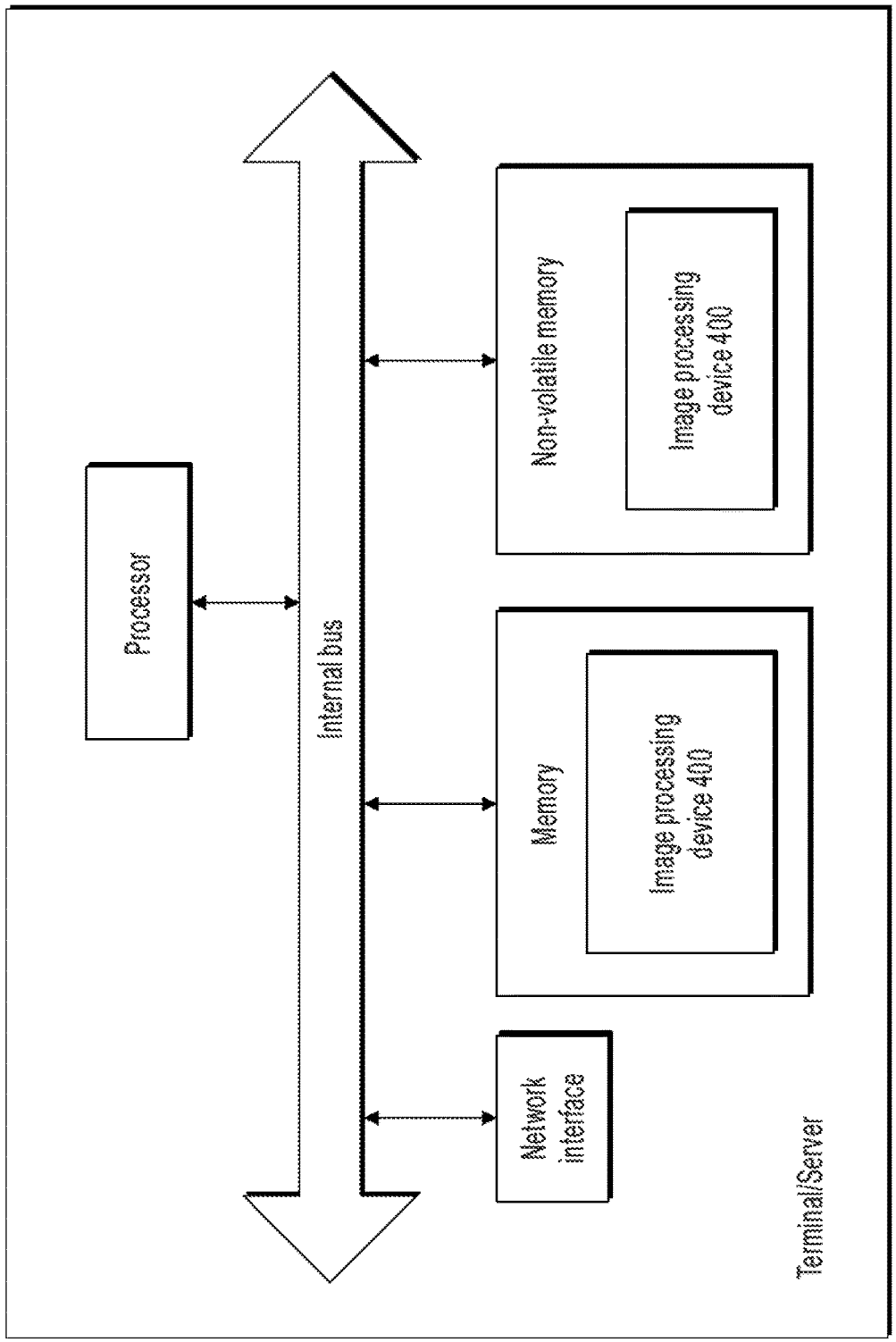
FIG. 4 is a schematic structural diagram illustrating an image processing device, according to an example implementation of the present application.

The implementation of the image processing device in the present application can be applied to a terminal device or a server. The device implementation can be implemented by using software, hardware, or both. Software implementation is used as an example. As a logical device, the device is formed by reading a corresponding computer program instruction in a non-volatile memory into the memory by a processor of the terminal device or the server where the device is located. From a hardware perspective, as shown in FIG. 4, FIG. 4 is a structural diagram illustrating hardware of a terminal device or a server where an image processing device in the present application is located. In addition to a processor, a memory, a network interface, and a non-volatile memory shown in FIG. 4, the terminal device or the server where the device in the present implementation is located can usually include other hardware based on actual functions of the terminal device or the server. Details are not repeated here.

Figure 5:
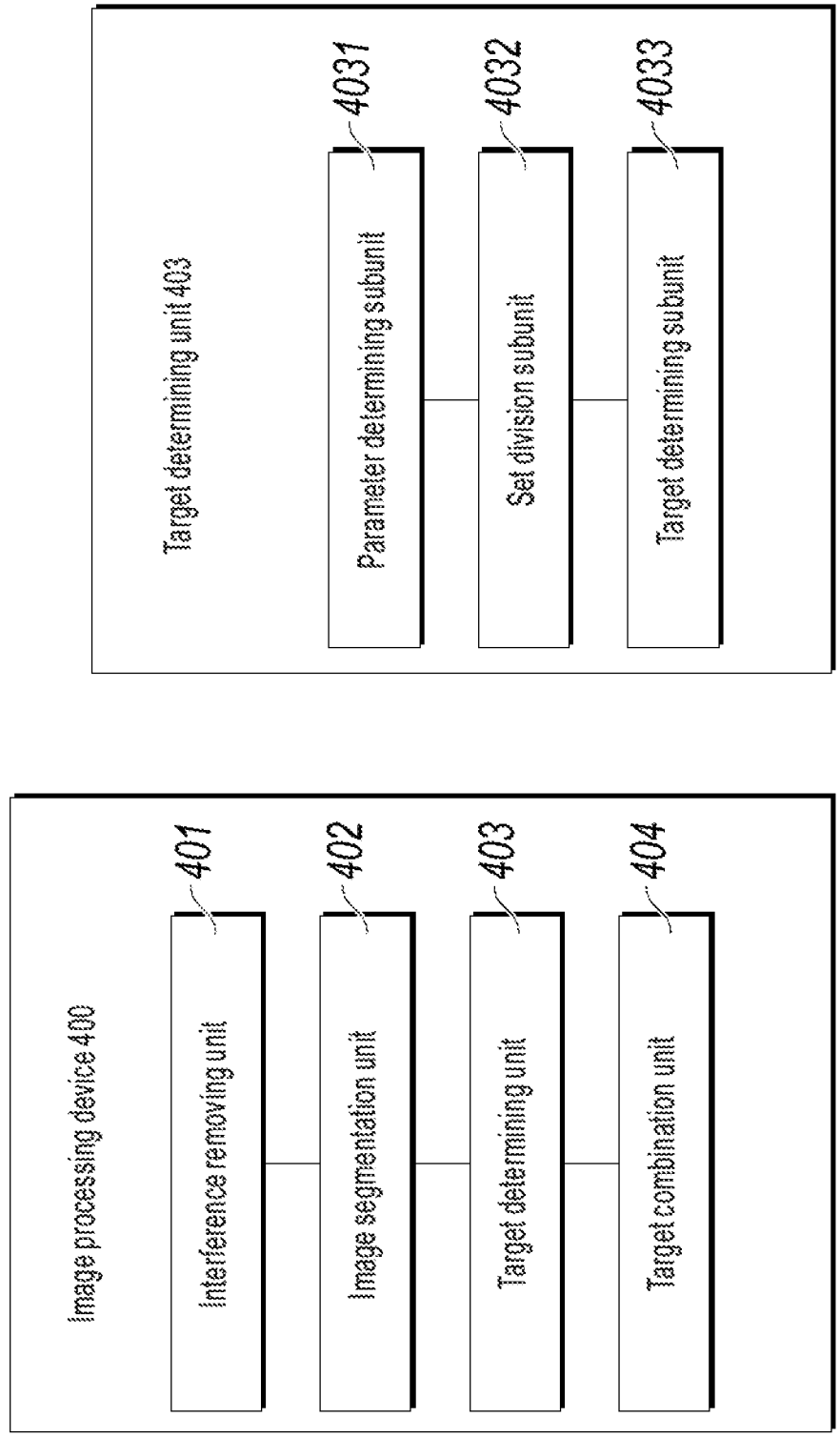
FIG. 5 is a schematic structural diagram illustrating an image processing device, according to an example implementation of the present application.

FIG. 5 is a schematic structural diagram illustrating an image processing device, according to an example implementation of the present application.

Referring to FIG. 5, the image processing device 400 can be applied to the terminal device or the server shown in FIG. 4, and includes an interference removing unit 401, an image segmentation unit 402, a target determining unit 403, and a target combination unit 404. The target determining unit 403 can further include a parameter determining subunit 4031, a set division subunit 4032, and a target determining subunit 4033.

The interference removing unit 401 is configured to remove an interference factor from an original image by using a plurality of methods, to obtain a plurality of sample images.

The image segmentation unit 402 is configured to segment each sample image into a plurality of sample sub-images based on a predetermined segmentation rule.

The target determining unit 403 is configured to determine a target sub-image from sample sub-images that have the same attributes.

The target combination unit 404 is configured to combine a plurality of target sub-images with different attributes into a target image.

The parameter determining subunit 4031 is configured to determine a mathematical parameter of each sample sub-image.

The set division subunit 4032 is configured to divide the sample sub-images that have the same attributes into a plurality of image sets based on the mathematical parameters by using a clustering algorithm. Each image set includes one or more sample sub-images.

The target determining subunit 4033 is configured to determine the target sub-image from an image set that includes the maximum number of sample sub-images.

Optionally, the parameter determining subunit 4031 is configured to generate an RGB vector for the sample sub-image based on RGB information of each pixel in the sample sub-image to use the RGB vector as the mathematical parameter of the sample sub-image.

Optionally, the target determining subunit 4033 is configured to determine, as the target sub-image from the image set that includes the maximum number of sample sub-images, a sample sub-image that corresponds to the center point in the image set obtained after clustering.

Optionally, the target combination unit 404 is configured to combine the plurality of target sub-images with different attributes into the target image based on location coordinates of each pixel in the target sub-image.

For implementation process of functions and roles of units in the device, reference can be made to an implementation process of a corresponding step. Details are not described here.

Device implementation can generally correspond to method implementations. As such, for related descriptions, reference can be made to descriptions of the method implementations. The described device implementations are merely examples. The units described as separate parts may or may not be physically separate, and parts displayed as units may or may not be physical units. They may be located in one position, or may be distributed on a plurality of network units. Some or all of the modules can be selected according to actual needs to achieve the objectives of the solutions of the present application. A person of ordinary skill in the art can understand and implement the implementations of the present invention without creative efforts.

The foregoing descriptions are merely examples of the implementations of the present application. They are not intended to limit the present application. Any modification, equivalent replacement, or improvement made without departing from the spirit and principle of the present application shall fall within the protection scope of the present application.

Figure 6:
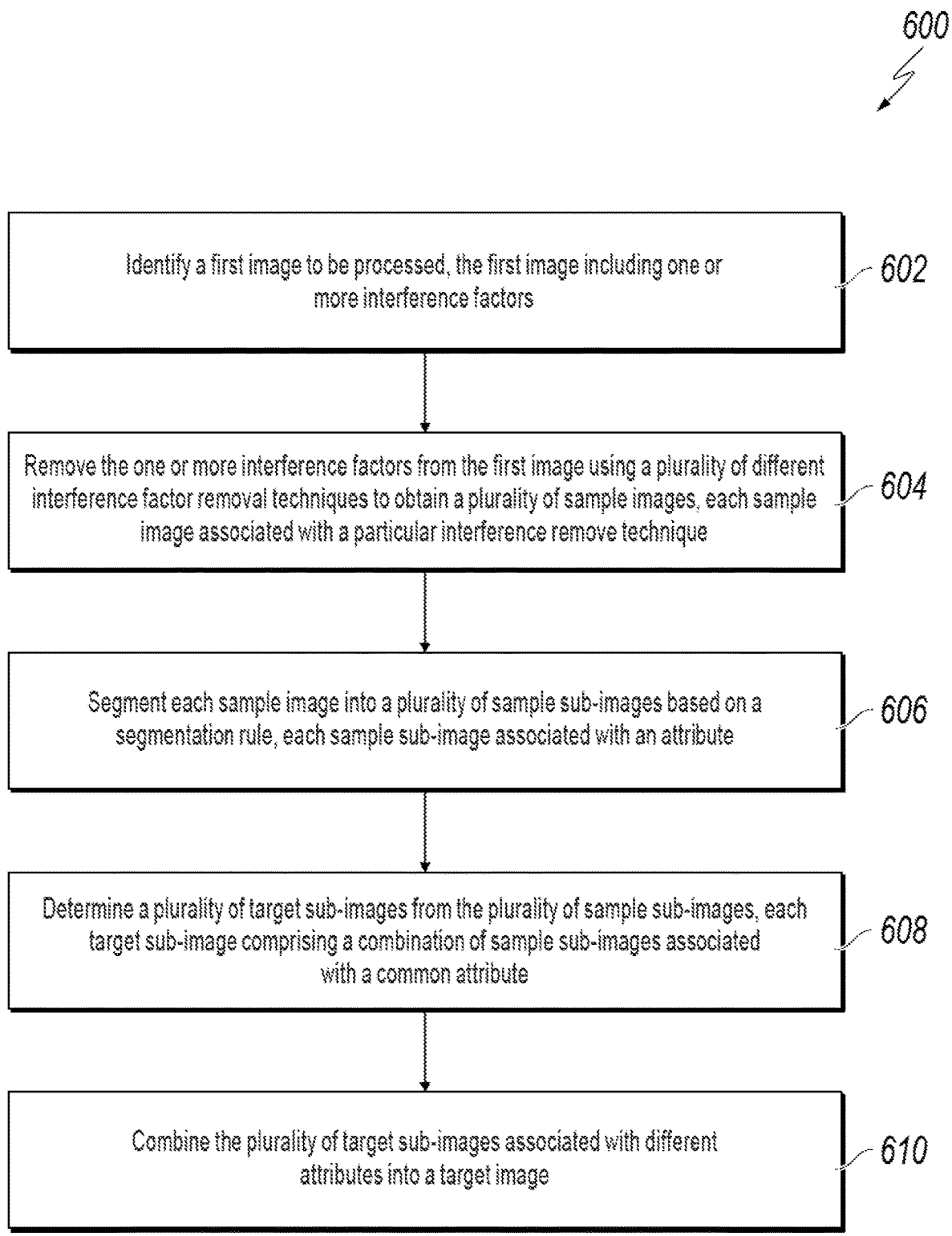
FIG. 6 is a flowchart illustrating an example of a computer-implemented method for image processing, according to an implementation of the present disclosure.

FIG. 6 is a flowchart illustrating an example of a computer-implemented method 600 for image processing, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a first image to be processed is identified. The first image may be an original image upon which one or more interference factors may have been applied. The interference factors may include, but are not limited to, an interference pattern. In some instances, the interference factor may include a reticulated pattern or a watermark added to the original image to form the first image. In some instances, multiple interference factors may be applied to the first image, while in others, a single interference factor may be applied. In some instances, the interference factor may be applied to a particular and relatively small area of the image, such as a corner or edge, while in others, the interference pattern may be applied to a relatively larger area of the image, modifying the image as a whole, or a large portion thereof. From 602, method 600 proceeds to 604.

At 604, the one or more interference factors can be removed from the first image using a plurality of different interference factor removal techniques (for example, proprietary, commercial, or open source), where the use of each removal technique results in obtaining a corresponding sample image. Each sample image can be associated with a particular interference factor removal technique. For example, N sample images can be obtained if the interference factor(s) in the first image is removed using different removal techniques. Any number of removal techniques consistent with this disclosure can be applied, including those available to persons of ordinary skill in the art. Example removal techniques may include the use of a particular image processing software, such as ADOBE PHOTOSHOP. The different removal techniques may include using the same image processing software using different settings, the use of different image processing software (for example, ADOBE PHOTOSHOP, COREL PAINTSHOP PRO, or GIMP), as well as other alternative methods of removal. From 604, method 600 proceeds to 606.

At 606, each sample image is segmented into a plurality, N, of sample sub-images based on a segmentation rule. In some examples, the segmentation rule can be predetermined. In some examples, the segmentation rule can be determined by a user, developer, application, software, or another suitable agent, person, entity, or component. The unit or determination for segmenting the sample sub-images may be a size of the sub-images (for example, X pixels by Y pixels), a number of sample sub-images per sample image, or any other suitable unit or determination. In one example, each sample image can be segmented into 25 sample sub-images based on a 5×5 rule segmenting the sample images into equal or non-equal sub-images. Referring back to 604, if N sample images are generated, and the number of sample sub-images segmented per sample image is M, then N×M sample sub-images will be obtained. N and M are natural numbers greater than 1.

Each sample sub-image includes or is associated with at least one corresponding attribute. The attribute, for instance, can be used to indicate location information of the sample sub-image in the corresponding sample image that includes that sample sub-image. In equal segmentations of sample images, the corresponding location of the sampled sub-images will be similar as described in reference to FIG. 3, for example. From 606, method 600 proceeds to 608.

At 608, a plurality of target sub-images are determined from the plurality of sample sub-images, where each target sub-image comprises a combination of sample sub-images associated with a common attribute. Where the attribute identifies a location within the sample image for sample sub-images, for example, target sub-images can be determined based on sample sub-images having identical attributes, and are therefore in the same location in different ones of the plurality of sample images. If 25 sample sub-images in a 5×5 grid are obtained after application of the segmentation rule, then 25 target sub-images may be determined at 608. Each target sub-image determined is associated with a different attribute. As previously described in FIG. 3, a process of determining a target sub-image from sample sub-images having the same attributes is described. From 608, method 600 proceeds to 610.

At 610, the plurality of target sub-images having different attributes are combined into a target image. Combining the plurality of target sub-images can be performed based on the attribute of each target sub-image, such as in a grid-based segmentation rule. Alternatively, the plurality of target sub-images can be combined into the target image based on location coordinates of each pixel in each target sub-image. After 610, method 600 stops.

Implementations of the subject matter described in this specification can be implemented so as to realize particular advantages or technical effects. For example, implementations of the described subject matter permits enhanced image processing efficiency. For example, the described methodology permits restoration of a real image (that is, sub-image) following removal of an interference factor (for example, a reticulated pattern or watermark) in the original image. The real image can be restored with high-precision to improve accuracy of subsequent image recognition. The real image can be used for a multitude of purposes, including data security, identification, and selection.

In some implementations, interference factor removal techniques can be selected to improve overall image processing efficiency. For example, to increase processing efficiency, data transmission requirements, or data storage requirements, one or more particular interference factor removal techniques can be chosen to process an original image in a manner consistent with desired computational requirements or goals. Similarly, in a security setting, one or more particular removal techniques can be selected to ensure the precision/accuracy of the sub-image for particular security requirements.

Aspects of the methodology can be used in a manner to enhance or to optimize, consistent with static or dynamic parameter value(s), computer processing cycles, computer memory usage, or network bandwidth. Any other computational value can be considered consistent with this disclosure. For example, the use of interference factor removal techniques, segmentation of sample images into sample sub-images, determination of target sub-images, and combination of the target sub-images can be performed to particularly affect one or more of particular computer processing cycles, computer memory usage, or network bandwidth requirements, thresholds, or goals.

In some implementations, data can be sent to a computing device (for example, to use on a graphical user interface). In these implementations, elements of a particular graphical user interface executing on the computing device can be positioned to be least obtrusive for a user. For example, the elements can be positioned in a way to obscure the least amount of data and to avoid covering any critical or often-used graphical user interface elements.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
identifying a first image to be processed, the first image including one or more interference factors;
removing the one or more interference factors from the first image using a plurality of different interference factor removal techniques to obtain a plurality of sample images, wherein each of the plurality of sample images is associated with a particular interference factor removal technique;
segmenting each sample image of the plurality of sample images into a plurality of sample sub-images based on a segmentation rule, wherein each sample sub-image is associated with an attribute;
determining a plurality of target sub-images from the plurality of sample sub-images, wherein each target sub-image comprises a combination of sample sub-images associated with a common attribute, and wherein each target sub-image is associated with a different attribute; and
combining the plurality of target sub-images associated with different attributes into a target image.

2. The computer-implemented method of claim 1, wherein determining the plurality of target sub-images comprises, after segmented each sample image of the plurality of sample images into the plurality of sample sub-images:
determining a mathematical parameter of each sample sub-image of the plurality of sample sub-images;
dividing the sample sub-images associated with a common attribute into a plurality of image sets based on the determined mathematical parameters, wherein each image set includes one or more sample sub-images; and
determining target sub-images from an image set that includes a maximum number of sample sub-images.

3. The computer-implemented method of claim 2, wherein determining the mathematical parameter of each sample sub-image of the plurality of sample sub-images comprises, for each sample sub-image:
generating an RGB vector for the sub-image based on RGB information of each pixel in the sample sub-image; and
identifying the RGB vector as the mathematical parameter of the sample sub-image.

4. The computer-implemented method of claim 2, wherein the sample sub-images associated with a common attribute are divided into a plurality of image sets based on the determined mathematical parameters using a clustering algorithm.

5. The computer-implemented method of claim 4, wherein the determining the target sub-image from an image set that comprises the maximum number of sample sub-images comprises determining, as the target sub-image from the image set that comprises the maximum number of sample sub-images, a sample sub-image that corresponds to the center point in the image set obtained after clustering.

6. The computer-implemented method of claim 1, wherein the one or more interference factors include at least one of a reticulated pattern or a watermark included in the first image.

7. The computer-implemented method of claim 1, wherein at least one of the plurality of different interference factor removal techniques includes removal of the one or more interference factors using a particular image processing software application.

8. The computer-implemented method of claim 1, wherein the attributes associated with a particular sample sub-image represent a location within the sample image associated with the sample image, and wherein combining the plurality of target sub-images associated with different attributes into a target image comprises combining the plurality of target sub-images associated with different attributes into the target image based on location coordinates of each pixel in the target sub-image.

9. A non-transitory, computer-readable medium storing one or more instructions executable by a computer system to perform operations comprising:
  identifying a first image to be processed, the first image including one or more interference factors;
  removing the one or more interference factors from the first image using a plurality of different interference factor removal techniques to obtain a plurality of sample images, wherein each of the plurality of sample images is associated with a particular interference factor removal technique;
  segmenting each sample image of the plurality of sample images into a plurality of sample sub-images based on a segmentation rule, wherein each sample sub-image is associated with an attribute;
  determining a plurality of target sub-images from the plurality of sample sub-images, wherein each target sub-image comprises a combination of sample sub-images associated with a common attribute, and wherein each target sub-image is associated with a different attribute; and
  combining the plurality of target sub-images associated with different attributes into a target image.

10. The non-transitory, computer-readable medium of claim 9, wherein determining the plurality of target sub-images comprises, after segmented each sample image of the plurality of sample images into the plurality of sample sub-images:
  determining a mathematical parameter of each sample sub-image of the plurality of sample sub-images;
  dividing the sample sub-images associated with a common attribute into a plurality of image sets based on the determined mathematical parameters, wherein each image set includes one or more sample sub-images; and
  determining target sub-images from an image set that includes a maximum number of sample sub-images.

11. The non-transitory, computer-readable medium of claim 10, wherein determining the mathematical parameter of each sample sub-image of the plurality of sample sub-images comprises, for each sample sub-image:
  generating an RGB vector for the sub-image based on RGB information of each pixel in the sample sub-image; and
  identifying the RGB vector as the mathematical parameter of the sample sub-image.

12. The non-transitory, computer-readable medium of claim 10, wherein the sample sub-images associated with a common attribute are divided into a plurality of image sets based on the determined mathematical parameters using a clustering algorithm.

13. The non-transitory, computer-readable medium of claim 12, wherein the determining the target sub-image from an image set that comprises the maximum number of sample sub-images comprises determining, as the target sub-image from the image set that comprises the maximum number of sample sub-images, a sample sub-image that corresponds to the center point in the image set obtained after clustering.

14. The non-transitory, computer-readable medium of claim 9, wherein the one or more interference factors include at least one of a reticulated pattern or a watermark included in the first image.

15. The non-transitory, computer-readable medium of claim 9, wherein at least one of the plurality of different interference factor removal techniques includes removal of the one or more interference factors using a particular image processing software application.

16. The non-transitory, computer-readable medium of claim 9, wherein the attributes associated with a particular sample sub-image represent a location within the sample image associated with the sample image, and wherein combining the plurality of target sub-images associated with different attributes into a target image comprises combining the plurality of target sub-images associated with different attributes into the target image based on location coordinates of each pixel in the target sub-image.

17. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    identifying a first image to be processed, the first image including one or more interference factors;
    removing the one or more interference factors from the first image using a plurality of different interference factor removal techniques to obtain a plurality of sample images, wherein each of the plurality of sample images is associated with a particular interference factor removal technique;
    segmenting each sample image of the plurality of sample images into a plurality of sample sub-images based on a segmentation rule, wherein each sample sub-image is associated with an attribute;
    determining a plurality of target sub-images from the plurality of sample sub-images, wherein each target sub-image comprises a combination of sample sub-images associated with a common attribute, and wherein each target sub-image is associated with a different attribute; and
    combining the plurality of target sub-images associated with different attributes into a target image.

18. The computer-implemented system of claim 17, wherein determining the plurality of target sub-images comprises, after segmented each sample image of the plurality of sample images into the plurality of sample sub-images:
  determining a mathematical parameter of each sample sub-image of the plurality of sample sub-images;
  dividing the sample sub-images associated with a common attribute into a plurality of image sets based on the determined mathematical parameters, wherein each image set includes one or more sample sub-images; and
  determining target sub-images from an image set that includes a maximum number of sample sub-images.

19. The computer-implemented system of claim 18, wherein determining the mathematical parameter of each sample sub-image of the plurality of sample sub-images comprises, for each sample sub-image:
  generating an RGB vector for the sub-image based on RGB information of each pixel in the sample sub-image; and
  identifying the RGB vector as the mathematical parameter of the sample sub-image.

20. The computer-implemented system of claim 18, wherein the sample sub-images associated with a common attribute are divided into a plurality of image sets based on the determined mathematical parameters using a clustering algorithm.

* * * * *